Dec. 31, 1963 W. H. MEIKLEJOHN 3,116,255
MAGNETIC BODIES CONTAINING MAGNETICALLY COUPLED
FERROMAGNETIC AND FERRIMAGNETIC PROTIONS
Filed Oct. 31, 1961

Inventor:
William H. Meiklejohn,
by Richard A. Speer
His Attorney.

United States Patent Office 3,116,255
Patented Dec. 31, 1963

3,116,255
MAGNETIC BODIES CONTAINING MAGNETI-
CALLY COUPLED FERROMAGNETIC AND
FERRIMAGNETIC PORTIONS
William H. Meiklejohn, Scotia, N.Y., assignor to General
Electric Company, a corporation of New York
Filed Oct. 31, 1961, Ser. No. 149,000
3 Claims. (Cl. 252—62.5)

This invention relates to magnetic bodies and more particularly to magnetic bodies comprising ferromagnetic and ferrimagnetic parts which are joined in cooperative relationship, producing unique magnetic characteristics.

As is well known, certain types of electrical induction apparatus require the use of magnetic materials having high residual-to-saturation induction ratios to obtain maximum performance. It is also often desirable that the magnetic materials possess uniaxial anisotropy and/or high rotational hysteresis properties and where permanent magnetic characteristics are sought that they have large coercive forces.

It is an object of this invention to provide magnetic bodies having uniaxial magnetic anisotropy and/or high rotational hysteresis values.

Another object of this invention is to provide composite magnetic bodies having improved residual-to-saturation induction ratios.

A further object of this invention is to provide composite magnetic bodies having improved magnetic coercivity.

Another object of this invention is to provide magnetic bodies comprising ferromagnetic and ferrimagnetic portions which are magnetically coupled to obtain improved magnetic characteristics.

Other objects and advantages of this invention will be in part obvious and in part explained by reference to the accompanying specification and drawings, in which.

Figure 1:
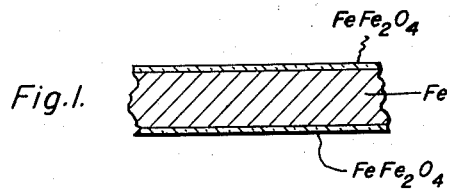
FIG. 1 is a section through a magnetic body according to the present invention.

Generally, the composite magnetic bodies of this invention comprise a ferromagnetic substrate body of a metal from the group consisting of iron, nickel, cobalt, and alloys thereof and a ferrimagnetic ferrite magnetically coupled to the ferromagnetic body to introduce a magnetic bias resulting in over-all uniaxial magnetic anisotropy in the composite. The ferrimagnetic portion of the composite bodies may be selected from the group of materials $\gamma Fe_2O_3$ and ferrites of the metals iron, nickel, cobalt, zinc, barium, copper, manganese and magnesium. Further, it is essential that the ferromagnetic and ferrimagnetic portions of the composite body be magnetically coupled, that is, that particular crystallographic planes of each of the portions be so joined that magnetic epitaxy is present. Magnetic epitaxy is the continuation of the particular alignment of magnetic moments across the interface between the ferromagnetic and the ferrimagnetic portions; that is, the adjoining magnetic moments on each side of the interface are aligned in the same direction. The ferrimagnetic portion may comprise a surface layer suitably deposited on the ferromagnetic substrate and appropriately treated or, alternatively, the ferrimagnetic portion may be dispersed throughout the ferromagnetic substrate portion.

When ferromagnetic materials are coupled to ferrimagnetic materials according to the invention, a magnetic interaction takes place which enables the attainment of unique magnetic characteristics in the composite body. Particularly, uniaxial magnetic anisotropy is obtained which produces high rotational hysteresis properties, a sin $2\theta$ torque curve and higher residual-to-saturation induction ratios. Through use of the concept of this invention, it is possible to square the hysteresis loops normally observed when ferromagnetics of the type described are measured in a cyclically-reversed magnetic field.

It will be understood that in ferromagnetic materials of the type with which this application is concerned, the magnetic moments are of equal magnitude, commonly aligned and subject to reversal by means of an externally applied magnetic field. The ferrimagnetic materials, on the other hand, have two sets of magnetic moments, one set of comparatively large magnitude and commonly aligned and the other set of comparatively smaller magnitude and commonly aligned in a direction opposite that of the larger magnetic moments. Applicant has surprisingly found that by coupling the ferromagnetic and ferrimagnetic portions, the differences existing between the sizes and directions of the magnetic moments result in uniaxial magnetic anistropy in the over-all composite.

Bodies of this invention can be produced by preparing a suitable substrate body of a ferromagnetic material selected from the group consisting of iron, nickel, cobalt, and alloys thereof. These ferromagnetic materials may contain some minor percentage of an alloying ingredient to obtain special magnetic properties, but the amount of any materials added must be retained below the point at which the ferromagnetic characteristics of the base are altered. A ferrimagnetic ferrite is then placed on the ferromagnetic body by any suitable means such as oxidation, plating and subsequent oxidation, vapor deposition, etc.

Once a composite body comprising a ferromagnetic substrate and the ferrimagnetic portion has been prepared, the composite body is heated to a temperature above $T_n$ (Néel temperature) and then cooled to a temperature below $T_n$. The Néel temperature is that below which the ferrimagnetic materials exhibit ferrimagnetic properties and above which they exhibit paramagnetic properties. It corresponds roughly to the Curie temperature for normal ferromagnetic materials. Since magnetic coupling between the ferromagnetic and ferrimagnetic portions is essential to development of the desired uniaxial magnetic anisotropy, the magnetic moments of the ferrimagnetic portion must be ordered. Depending upon the ferrimagnetic material used, uniaxial magnetic anisotropy can be obtained by different methods. As a general matter, ferrites containing a single metal, for example, $MnFe_2O_4$ and $MgFe_2O_4$, must have a permanent strain induced therein, while ferrites containing two or more metals, for example, $Ni_xZn_{1-x}Fe_2O_4$, $Fe_xNi_{1-x}Fe_2O_4$, $Fe_xMn_{1-x}Fe_2O_4$ or $Fe_xCu_{1-x}Fe_2O_4$, can acquire the required anistropy by merely cooling in a magnetic field. The ferrite $CoFe_2O_4$ is a specific exception to the rule, since anistropy can be obtained in this single ferrite by cooling in a magnetic field.

Strain can be introduced into the ferrimagnetic by subjecting the body either to tension or compression or by any other well known and suitable means. For example, where there is a difference between the coefficients of thermal expansion in the ferrimagnetic and ferromagnetic portions, the required straining will occur during cooling. Obviously, the direction of strain in the body should be such as to introduce unidirectional anistropy in the ferromagnetic which corresponds to that desired in the ferromagnetic body.

Examples of the single metal ferrites which require straining to develop the uniaxial magnetic anistropy are $FeFe_2O_4$, $ZnFe_2O_4$, $BaFe_2O_4$, $CuFe_2O_4$, $NiFe_2O_4$, $\gamma Fe_2O_3$, $MnFe_2O_4$, and $MgFe_2O_4$. If it is preferred to obtain the uniaxial magnetic anisotropy by cooling in an applied magnetic field, ferrites containing at least two metals may be used. For example, plural metal ferrites such as those mentioned previously, may be used. From one to five percent of $CoFe_2O_4$ may be added to any of the other single metal ferrites listed and make it possible to obtain uniaxial anistropy by cooling in a magnetic field. Also, $FeFe_2O_4$ develops a uniaxial anisotropy when cooled in a magnetic field from any temperature above about $-160°$ C. to a lower temperature due to a cubic to orthorhombic transformation.

Figure 2:
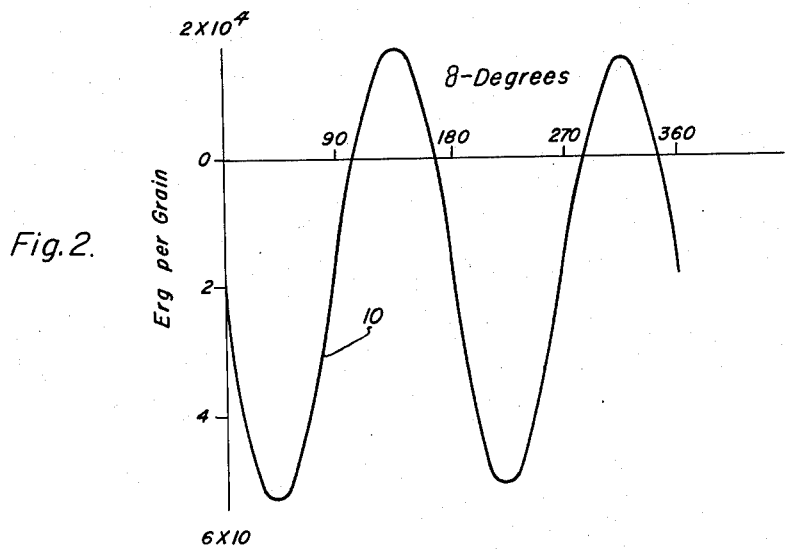
FIG. 2 is a graph showing the magnetic torque curve of a magnetic body of this invention.

As an example of a body produced according to the present invention, an iron body was oxidized to form an outer layer of $Fe_3O_4$ or, written in the ferrite form, $FeFe_2O_4$, on its outer surface. This body was then heated to a temperature above the Néel temperature of the $FeFe_2O_4$ and subsequently cooled and strained to produce spin alignment and develop the uniaxial magnetic anisotropy. To determine the magnetic properties of this body, it was subjected to a magnetic field and the rotational torque plotted. The curve produced is indicated by the numeral 10 in FIG. 2 of the drawings. It is obvious that the interaction between the ferromagnetic and the ferrimagnetic portions exerted an effect on the magnetic characteristics of the body since a large sin $2\theta$ torque developed in the material and the torque curve is shifted from the abscissa. Had magnetic coupling between the two portions not taken effect, then only a very small sin $2\theta$ torque curve would have been present and the entire curve would not have been shifted from the abscissa.

Figure 3:
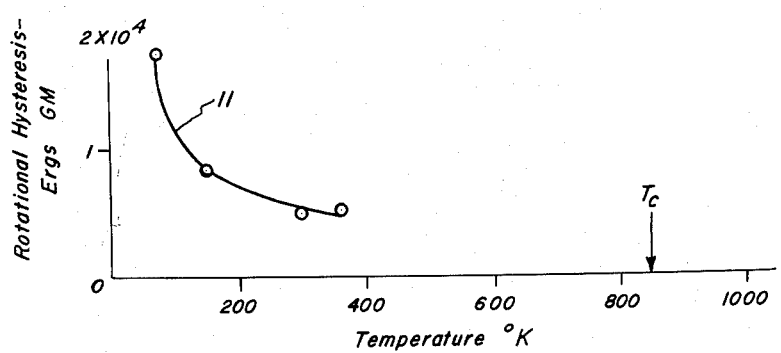
FIG. 3 is a graph showing the rotational hysteresis of the same body obtained from torque curves similar to FIG. 2.

Curve 11 of FIG. 3 clearly indicates that the torque curve has an average value that is quite different from zero, it being about 1700 dyne centimeters per gram of material. This rotational hysteresis also evidences the interaction obtained between the ferromagnetic and the ferrimagnetic portions of the composite body.

While in the example given, the surface of the ferromagnetic body was oxidized to form the ferrimagnetic ferrite portion, as already mentioned, the ferrimagnetic can be applied by any one of several suitable means. Additionally, bodies having the described unique properties can be obtained by preparing sintered conpacts consisting of finely-divided ferromagnetic bodies having ferrimagnetic portions in exchange contact therewith.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. An article of manufacture comprising, a ferromagnetic substrate body composed principally of a metal selected from the group consisting of iron, nickel, cobalt and alloys thereof, and a ferrimagnetic ferrite layer selected from the group consisting of $Fe_2O_3$ and ferrites of the metals iron, nickel, cobalt, zinc, barium, copper, manganese and magnesium, said ferrite layer being magnetically coupled to said substrate body by heating the article to a temperature above the Néel temperature ($T_n$), then cooling it below the Néel temperature and straining the article to order the magnetic moments of the ferrite layer.

2. An article as defined in claim 1 wherein said ferrimagnetic ferrite contains at least two metals from the group consisting of iron, nickel, cobalt, zinc, barium, copper, manganese and magnesium.

3. An article as defined in claim 1 wherein said ferrimagnetic ferrite is $CoFe_2O_4$.

References Cited in the file of this patent

UNITED STATES PATENTS

| 1,669,648 | Bandur | May 15, 1928 |
| 2,853,407 | Rogers | Sept. 23, 1958 |

FOREIGN PATENTS

| 1,168,240 | France | Aug. 25, 1958 |
| 805,710 | Great Britain | Dec. 10, 1958 |